United States Patent
Kuenkel et al.

(10) Patent No.: US 10,663,024 B2
(45) Date of Patent: May 26, 2020

(54) BRAKE SYSTEM FOR A VEHICLE

(71) Applicant: MANDO CORPORATION, Gyeonggi-do (KR)

(72) Inventors: Axel J. Kuenkel, Stutensee (DE); Ralf Leiter, Mendig (DE)

(73) Assignee: MANDO CORPORATION, Gyeonggi-Do (KR)

( * ) Notice: Subject to any disclaimer, the term of this patent is extended or adjusted under 35 U.S.C. 154(b) by 1 day.

(21) Appl. No.: 16/013,940

(22) Filed: Jun. 21, 2018

(65) Prior Publication Data

US 2018/0372176 A1     Dec. 27, 2018

(30) Foreign Application Priority Data

Jun. 21, 2017     (DE) .................... 10 2017 210 395

(51) Int. Cl.
*F16D 65/18*     (2006.01)
*F16D 65/00*     (2006.01)
(Continued)

(52) U.S. Cl.
CPC ......... *F16D 65/18* (2013.01); *F16D 65/0006* (2013.01); *F16D 2121/04* (2013.01); *F16D 2121/16* (2013.01); *F16D 2125/06* (2013.01)

(58) Field of Classification Search
CPC .... F16F 65/18; F16F 2121/04; F16F 2121/06; F16F 65/0006; F16F 2125/40; F16F 2123/00; F16F 2121/18; F16F 2121/26; F16F 2121/16; F16F 2125/06; F16H 25/2204
(Continued)

(56) References Cited

U.S. PATENT DOCUMENTS 3,534,835 A * 10/1970 Meier ..................... F16D 65/18
                                                    188/196 R
5,613,577 A *  3/1997 Collin .................... B60T 1/065
                                                    188/234
(Continued)

FOREIGN PATENT DOCUMENTS

DE     10 2010 033 255     2/2012
DE     10 2014 002 133     8/2014

OTHER PUBLICATIONS

Office Action dated Sep. 26, 2018 for German Patent Application No. 10 2017 210 395.7 and its English machine translation by Google Translate.

*Primary Examiner* — Pamela Rodriguez
(74) *Attorney, Agent, or Firm* — Ladas & Parry, LLP

(57) ABSTRACT

The invention relates to a brake system for a vehicle, comprising a cylinder (3), a piston (4) having a closed end (4b) and an open end (4a) and being movably arranged within the cylinder (3), and a further part protruding through the open end (4a) into a cavity of the piston (4), the further part comprising a shaft (6) arranged along a longitudinal axis (5) of the cylinder (3) and a head having a larger diameter than the shaft (6), wherein a resetter for the piston (4) is arranged within the cavity of the piston (4) to allow for a transmission of forces between the head of the further part and the resetter in a direction of the longitudinal axis (5). At least a part of the resetter is elastic, wherein the resetter is in contact with the inner surface of the piston (4) so that the resetter can support a reverse movement of the piston (4) when a braking pressure is released.

12 Claims, 2 Drawing Sheets

(51) Int. Cl.
*F16D 121/16* (2012.01)
*F16D 125/06* (2012.01)
*F16D 121/04* (2012.01)

(58) Field of Classification Search
USPC ....... 188/72.4, 72.1, 72.3, 72.6, 71.9, 106 F, 188/156
See application file for complete search history.

(56) References Cited

U.S. PATENT DOCUMENTS

| | | | |
|---|---|---|---|
| 8,091,689 B2 | 1/2012 | Tristano et al. | |
| 8,225,910 B2 * | 7/2012 | Piccoli | F16D 65/18 188/196 A |
| 8,844,683 B2 * | 9/2014 | Sternal | B60T 7/107 188/72.6 |
| 9,316,277 B2 | 4/2016 | Winkler et al. | |
| 2010/0096222 A1 * | 4/2010 | Kang | F16D 65/18 188/72.3 |
| 2013/0186716 A1 * | 7/2013 | Kong | F16D 65/18 188/71.8 |
| 2014/0231189 A1 * | 8/2014 | Park | F16D 65/0068 188/72.3 |
| 2015/0240893 A1 | 8/2015 | Winkler et al. | |

\* cited by examiner

BRAKE SYSTEM FOR A VEHICLE

CROSS-REFERENCE TO RELATED APPLICATION

This application claims the priority to German Patent Application No. 102017210395.7 filed in the German Intellectual Property Office on Jun. 21, 2017, the entire contents of which is incorporated herein by reference.

BACKGROUND

The invention relates to a brake system for a vehicle which comprises a cylinder and a piston having a closed end and an open end and being movably arranged within the cylinder, wherein the piston is movable along the longitudinal axis by hydraulic pressure for pressing at least one brake pad against a brake disc, as defined in the preamble of the independent claim.

A brake system of this type comprises, in addition, a further part protruding through the open end into a cavity of the piston, the further part comprising a shaft arranged along a longitudinal axis of the cylinder and a head having a larger diameter than the shaft. A known brake system of this kind is disclosed, for example, in prior art document US 2015/0240893 A1, where the further part is a parking brake mechanism, the shaft being a spindle and the head being a nut engaged with the spindle and movable along the longitudinal axis by rotation of the spindle.

SUMMARY

A problem that may occur with known brake systems of this kind is that the piston does not move back to a starting position when a brake action is ended, be it by reducing the hydraulic pressure or by releasing the parking brake. The reason for this may be a so-called gap extrusion, i.e. a clamping of e seal such as an O-ring in a gap between a cylinder wall and the piston, the effect being that the brake pad or the brake pads remain in contact with the brake disc, which results in undesirable phenomena such as noise, vibration and harshness.

Thus, it is an object of the present invention to suggest a similar brake system which avoids noise, vibration and harshness problems of this kind. According to the invention, this object is achieved by a brake system according to claim 1. Embodiments of this brake system may show the additional features defined in the dependent claims.

A brake system for a vehicle according to the invention comprises a cylinder, a piston having a closed end and an open end and being movably arranged within the cylinder, a further part protruding through the open end into a cavity of the piston, the further part comprising a shaft arranged along a longitudinal axis of the cylinder and a head having a larger diameter than the shaft. In addition to that, the suggested brake system comprises a resetter for the piston which is arranged within the cavity of the piston to allow for a transmission of forces between the head of the further part and the resetter in a direction of the longitudinal axis, at least a part of the resetter being elastic, wherein the resetter is in contact with the inner surface of the piston so that the resetter can support a reverse movement of the piston, i.e. a resetting of the piston into a starting position, when a braking pressure is released. The effect is that the piston, which is movable along the longitudinal axis by, in particular, hydraulic pressure for pressing at least one brake pad against a brake disc, is reliably moved back to its starting position as soon as a brake action is ended so that the at least one brake pad is immediately removed from the brake disc. Thus, rattling and other kinds of noises and vibrations caused by brake pads touching a rotating brake disc as well as an extensive wear of brake linings and an unnecessary power consumption may be avoided.

The further part may, in particular, be a parking brake mechanism, the shaft being or comprising a threaded spindle and the head being a nut engaged with the spindle to be movable along the longitudinal axis by a rotation of the spindle for applying or releasing a force on the piston and thereby activating or deactivating an integrated parking brake. In this case, the resetter may help to move the piston into its original position in particular when the parking brake is released and the nut is, thus, moved towards the open end of the piston. The spindle of the parking brake mechanism will typically be driven by an electric motor, so that an ordinary hydraulic service brake and an electric parking brake are combined in the brake system.

The resetter may comprise a solid first component and an elastic second component, the first component encompassing the shaft and filling at least partly a space between the shaft and an inner surface of the piston, the second component being of a softer material than the first component and being connected to the first component at an outer surface of the first component. A front face of the first component facing the closed end of the piston can, in this case, be arranged for being supported by the head of the further part, the second component of the resetter being in contact with the inner surface of the piston so that the resetter can support the reverse movement of the piston when the braking pressure is released, for example when the head of the further part is moved towards the first component of the resetter for releasing the parking brake. An additional advantage of, in particular, this embodiment is that the resetter reduces a volume in the cavity which is to be filled with hydraulic fluid, which does not only reduce the needed amount of the hydraulic fluid but also the total weight of the brake system in operating condition.

Typically, there is a gap between the resetter and the shaft, so that the resetter is not in contact with the shaft. This is helpful, in particular, if the shaft is a rotatable part of a parking brake. In this case, it should at least be possible to rotate the shaft as well as to move the first component relative to the shaft in a direction of the longitudinal axis without any friction between the shaft and the resetter.

The resetter may be a two-component injection moulded part, the first component being made of a first plastic material and the second component being made of a second plastic material. This implies low material cost, simple manufacturing and little weight. Alternatively, the first component and the second component may be separately produced parts, the second component being mounted on the first component. In that case, the first component does not need to be of plastic material. It may, for example, be of metal instead. The second component can be made of any elastomer that is compatible with the hydraulic fluid.

In order to allow for a force transmission, the first component and the second component can be connected by at least one of a substance-to-substance bond, an adhesive bond and a positive connection.

In a typical embodiment, the second component of the resetter comprises two rings, the rings being spaced apart and encompassing the first component and the shaft. The rings may be O-rings mounted on the first component or, if the resetter is a two-component injection moulded part, a correspondingly shaped softer component of this injection moulded part. In any case, the second component does not need to be topologically connected but may comprise, for example, two disjoint elements. If the rings are arranged at a relatively large distance from each other, e.g. one of them close to the front face and the other close to an opposite face of the resetter or its first component, they may hold the resetter safely and prevent it from tilting.

The first component may be cylindrical or comprise a cylindrical shape, having grooves for the second component recessed in its outer surface and having a through hole along the longitudinal axis making space for the shaft of the further part, wherein the through hole may be cylindrical as well.

A contact pressure between the resetter and the inner surface of the piston can allow for a frictionally engaged transmission of forces between the resetter and the piston. This can, for example, be achieved by suitably choosing dimensions of the first and the second component and, in particular, the softer material of the second component, adjusting a contact pressure between the second component of the resetter and the inner surface of the piston such that it allows for a frictionally engaged transmission of forces between the second component and the piston. This helps ensuring that the resetter can perform its task of supporting the reverse movement of the piston. In addition or alternatively, the resetter and the piston may be shaped to allow for a positive transmission of forces between the resetter and the piston.

In order to allow the hydraulic fluid to freely flow towards the closed end of the piston and back for activating and deactivating the hydraulic brake, at least one groove and/or duct for brake fluid connecting the front face and a rear face of the first component may be recessed in or pass through the first component of the resetter.

For sealing the brake system, a seal ring surrounding the piston may be arranged in a groove which is provided in a wall of the cylinder, wherein the groove is facing the piston and wherein the seal ring is in sealing contact with the piston. As seal rings of this kind are prone to the problem of gap-extrusion and as they may impede a reverse movement of the piston by friction even if no gap-extrusion occurs, the suggested resetter is particularly useful in this case.

It should be noted that the cylinder of the brake system does not need to be a separate part. Instead, the cylinder may be an integral part of a housing of a brake caliper.

BRIEF DESCRIPTION OF THE DRAWINGS

An exemplary embodiment of the invention is, hereafter, described referring to FIGS. 1 to 3.

DETAILED DESCRIPTION OF EMBODIMENTS

Figure 1:
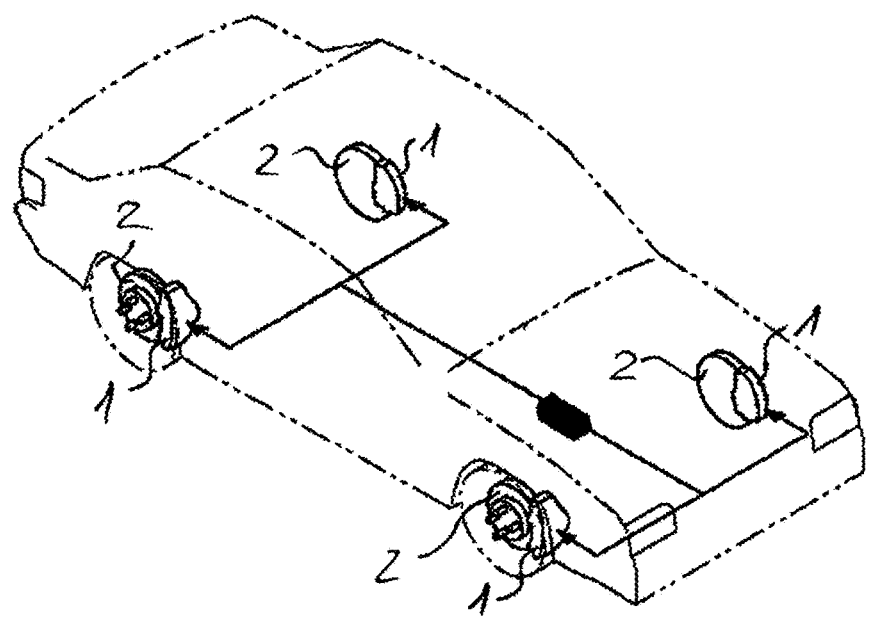
FIG. 1 shows schematically a perspective view of a vehicle with a brake system.

The vehicle shown in FIG. 1 has for wheels and a wheel brake for each of the wheels. FIG. 1 shows a brake caliper 1 and a brake disc 2 of each of these wheel brakes, which are of the disc brake type. They may be activated not only by hydraulic pressure of a brake fluid but also electrically so that an ordinary hydraulic service brake and an electric parking brake are combined in a brake system of the vehicle.

Figure 2:
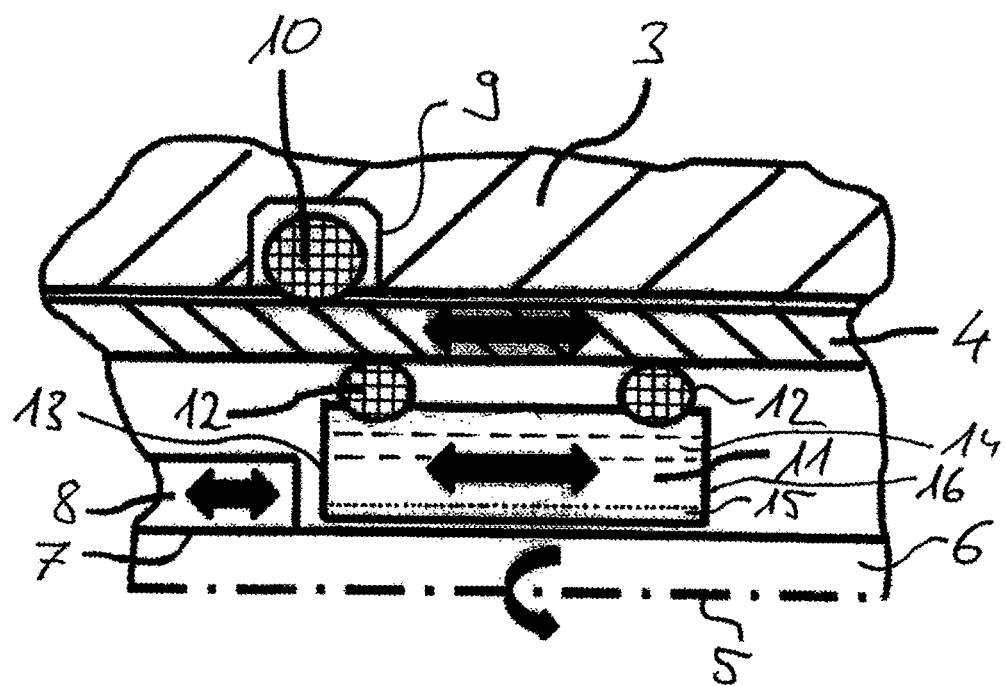
FIG. 2 shows a cross-sectional view of a detail of the brake system, the shown detail being a part above a longitudinal axis of a wheel brake cylinder, cut along the longitudinal axis.
Figure 3:
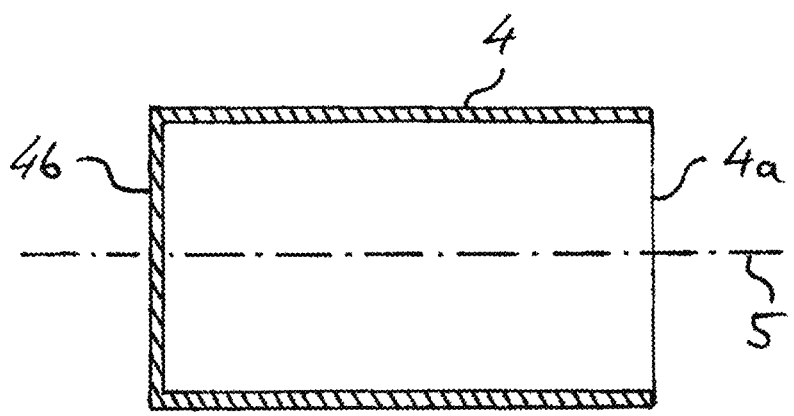
FIG. 3 shows a cross-sectional view of a piston of the brake system.

FIG. 2 shows a detail of the brake system, in particular a part of a cylinder 3 of the brake system, which is formed by and, thus, an integral part of a housing of the brake caliper 1 of one of the wheels, as well as a part of a piston 4, which is movably arranged within the cylinder 3. As far as the shown detail is concerned, the brake system has a rotational symmetry with regard to a longitudinal axis 5 of the cylinder 3. The piston 4 is movable along the longitudinal axis 5 for pressing at least one brake pad against the respective brake disc 2. As shown in FIG. 3, the piston 4 has an open end 4*a* (pointing to the right in FIG. 2) and a closed end 4*b* (pointing to the left in FIG. 2 and towards the respective brake disc 2) so that it can be moved along the longitudinal axis 5, in particular, by hydraulic pressure resulting from brake fluid being pressed into the cylinder 3 and through the open end 4*a* into a cavity of the piston 4.

The brake system further comprises a parking brake mechanism protruding through the open end 4*a* into the cavity of the piston 4. The parking brake mechanism comprises a shaft 6, which is arranged along the longitudinal axis 5 and has a threaded spindle 7 at its end, and a nut 8 engaged with the spindle 7. The shaft 6 with the spindle 7 can be driven by an electric motor (not shown) so that the nut 8 is moved along the longitudinal axis 5 by a rotation of the spindle 7 for applying or releasing a pressure on the closed end 4*b* of the piston 4 and thereby activating or deactivating the parking brake.

A groove 9 facing the piston 4 is provided in a wall of the cylinder 3, and a seal ring 10, which is an O-ring made of an elastomer, is arranged in the groove 9 and surrounds the piston 4 being in sealing contact with the piston 4.

FIG. 2 furthermore shows a resetter for resetting of the piston 4 into a starting position when a brake action is ended. The resetter, which is arranged within the cavity of the piston 4, comprises a solid first component 11 and an elastic second component 12, wherein the first component 11 encompasses the shaft 6 and partly fills a space between the shaft 6 and an inner surface of the piston 4, while the second component 12 comprises two rings, the rings being spaced apart and encompassing the first component 11 and the shaft 6. The first component 11 has a cylindrical shape, having grooves for the two rings of the second component 12 recessed in its outer surface and having a cylindrical through hole along the longitudinal axis 5, the shaft 6 being arranged in the through hole.

In the present embodiment, the resetter is a two-component injection moulded part, the first component 11 being made of a first plastic material and the second component 12 being made of a second plastic material, which is an elastomer and softer than the first plastic material. In an alternative embodiment, the first component 11 and the second component 12 may be separately produced parts, the second component 12 being two O-rings mounted on the first component. In that case, the first component 11 may be made of metal instead of plastic. In any case, the second component 12 is connected to first component 11 at the outer surface of the first component 11 by at least one of a substance-to-substance bond, an adhesive bond and a positive connection.

As can be seen in FIG. 2, the resetter is arranged within the cavity of the piston such that a front face 13 of the first component 11 facing the closed end 4*b* of the piston 4 can be supported by nut 8, the nut 8 being a stop preventing the first component 11 from moving further in a direction of the longitudinal axis 5 or forcing the first component in a direction away from the disc 2 when the first component 11 has come in contact with the nut 8. This happens, at the latest, when the piston 4 is moved towards the brake disc 2 by activating the hydraulic service brake or when the nut 8 is moved away from the closed end 4b of the piston 4 by releasing the parking brake.

At the same time, the second component 12 of the resetter is in contact with the inner surface of the piston 4 so that the resetter can support a reverse movement of the piston 4 when a braking pressure is released. To this end, a diameter of the first component 11 and a cross-section of the rings of the second component 12 are chosen such that a contact pressure between the second component 12 and the inner surface of the piston 4 is high enough to allow for a frictionally engaged transmission of forces between the second component 12 and the piston 4. This ensures that the resetter can perform its task of supporting the reverse movement of the piston 4 so that the at least one brake pad is immediately removed from the brake disc when the parking brake or the hydraulic service brake is released.

In order to make sure that the shaft 6 can be freely rotated and that the first component 11 can be moved relative to the shaft 6 in the direction of the longitudinal axis 5 without any friction between the shaft 6 and the resetter, a diameter of the through hole in the first component 11 is larger than a diameter of the shaft 6. Thus, a gap remains between the shaft 6 and the resetter, which is not in contact with the shaft 6.

Finally, as indicated in FIG. 2 by a dotted line and by dashed lines, ducts 14 and grooves 15 for brake fluid connecting the front face 13 and a rear face 16 of the first component 11 are recessed in or pass through the first component 11 of the resetter so that the brake fluid may freely flow towards the closed end 4b of the piston 4 and in the reverse direction when the hydraulic brake is activated or deactivated, respectively, even if the resetter is stopped by the nut 8.

The invention claimed is:

1. A brake system for a vehicle, comprising:
a cylinder,
a piston having a closed end and an open end and being movably arranged within the cylinder, and
a further part protruding through the open end into a cavity of the piston, the further part comprising a shaft arranged along a longitudinal axis of the cylinder and a head having a larger diameter than the shaft,
wherein the piston is movable along the longitudinal axis by hydraulic pressure for pressing at least one brake pad against a brake disc, wherein a resetter for the piston is arranged within the cavity of the piston to allow for a transmission of forces between the head of the further part and the resetter in a direction of the longitudinal axis, at least a part of the resetter being elastic, wherein the resetter is in contact with the inner surface of the piston so that the resetter can support a reverse movement of the piston when a braking pressure is released, and wherein the resetter is spaced apart from the shaft of the further part so that the resetter is movable with respect to the shaft of the further part.

2. The brake system of claim 1, wherein the further part is a parking brake mechanism, the shaft being or comprising a spindle and the head being a nut engaged with the spindle to be movable along the longitudinal axis by a rotation of the spindle for applying or releasing a pressure on the piston and thereby activating or deactivating an integrated parking brake.

3. The brake system of claim 1, wherein the resetter comprises a solid first component and an elastic second component, the first component encompassing the shaft and filling at least partly a space between the shaft and an inner surface of the piston, the second component being of a softer material than the first component and being connected to the first component at an outer surface of the first component,
wherein a front face of the first component facing the closed end of the piston is arranged for being supported by the head of the further part and wherein the second component of the resetter is in contact with the inner surface of the piston so that the resetter can support the reverse movement of the piston.

4. The brake system of claim 3, wherein a gap is located between the resetter and the shaft, so that the resetter is not in contact with the shaft.

5. The brake system of claim 3, wherein the resetter is a two-component injection moulded part, the first component being made of a first plastic material and the second component being made of a second plastic material.

6. The brake system of claim 3, wherein the second component of the resetter comprises two rings, the rings being spaced apart and encompassing the first component and the shaft.

7. The brake system of claim 3, wherein a contact pressure between the second component of the resetter and the inner surface of the piston allows for a frictionally engaged transmission of forces between the second component and the piston.

8. The brake system of claim 3, wherein the first component and the second component are connected by at least one of a substance-to-substance bond, an adhesive bond and a positive connection.

9. The brake system of claim 3, wherein at least one groove or duct for brake fluid connecting the front face and a rear face of the first component is recessed in or passes through the first component.

10. The brake system of claim 1, wherein a seal ring surrounding the piston is arranged in a groove which is provided in a wall of the cylinder, wherein the groove is facing the piston and wherein the seal ring is in sealing contact with the piston.

11. The brake system of claim 1, wherein the cylinder is an integral part of a housing of a brake caliper.

12. The brake system of claim 1, wherein the resetter comprises a plurality of rings spaced apart and encompassing the shaft.

* * * * *